(12) United States Patent
McRae

(10) Patent No.: US 9,900,541 B2
(45) Date of Patent: Feb. 20, 2018

(54) AUGMENTED REALITY REMOTE CONTROL

(71) Applicant: Vizio Inc, Irvine, CA (US)

(72) Inventor: Matthew Blake McRae, Irvine, CA (US)

(73) Assignee: Vizio Inc, Irvine, CA (US)

( * ) Notice: Subject to any disclaimer, the term of this patent is extended or adjusted under 35 U.S.C. 154(b) by 92 days.

(21) Appl. No.: 14/559,513

(22) Filed: Dec. 3, 2014

(65) Prior Publication Data

US 2016/0165170 A1    Jun. 9, 2016

(51) Int. Cl.
| | |
|---|---|
| *H04N 5/44* | (2011.01) |
| *H04N 21/422* | (2011.01) |
| *G08C 17/02* | (2006.01) |
| *G08C 23/04* | (2006.01) |
| *H04M 1/725* | (2006.01) |

(52) U.S. Cl.
CPC ........... *H04N 5/4403* (2013.01); *G08C 17/02* (2013.01); *G08C 23/04* (2013.01); *H04N 21/42204* (2013.01); *G08C 2201/30* (2013.01); *H04M 1/72533* (2013.01); *H04N 2005/4425* (2013.01); *H04N 2005/4428* (2013.01)

(58) Field of Classification Search
CPC ...... H04N 5/44; H04N 5/4403; H04N 21/422; H04N 21/42204; H04N 2005/4425; H04N 2005/4428; G06F 3/01; H04M 1/72533; G08C 2201/93
USPC ................. 348/734, 725, 722, 552; 345/633, 345/156–167; 725/39, 40, 43
See application file for complete search history.

(56) References Cited

U.S. PATENT DOCUMENTS

| | | | |
|---|---|---|---|
| 6,407,762 B2 | 6/2002 | Leavy | |
| 7,908,387 B2 | 3/2011 | Ku et al. | |
| 8,180,396 B2 * | 5/2012 | Athsani | G06F 3/011 |
| | | | 455/418 |
| 8,547,401 B2 | 10/2013 | Mallinson et al. | |
| 8,646,000 B2 * | 2/2014 | Kang | G06F 3/0482 |
| | | | 345/633 |
| 9,300,893 B2 * | 3/2016 | Tchigevsky | H04N 5/4403 |
| 9,350,850 B2 * | 5/2016 | Pope | G06F 3/0486 |
| 2002/0147797 A1 | 10/2002 | Paul | |
| 2011/0018903 A1 | 1/2011 | Lapstun et al. | |
| 2013/0010068 A1 | 1/2013 | Tiernan et al. | |
| 2013/0147837 A1 | 6/2013 | Stroila | |
| 2013/0249902 A1 | 9/2013 | Byrne et al. | |
| 2013/0257848 A1 | 10/2013 | Westerinen et al. | |

* cited by examiner

*Primary Examiner* — Trang U Tran
(74) *Attorney, Agent, or Firm* — Law Office of Scott C Harris, Inc

(57) ABSTRACT

An Augmented Reality (AR) device, places manual controls and virtual displays onto a surface of a controllable electronic device (CED) or next to the CED as viewed through the AR device allowing the user to manipulate the controls and view feedback via the virtual displays associated with the controllable device. The AR device overlays an image on a surface of the CED with virtual control objects and virtual feedback image(s) are displayed on a surface of the CED or adjacent to the CED. The user views the control objects and virtual displays on the surface and/or area adjacent to the CED. These control objects are manipulated via voice, hand, head, and eye gestures recognized by the AR device and will be able to see real time feedback displayed on the virtual displays.

2 Claims, 12 Drawing Sheets

AUGMENTED REALITY REMOTE CONTROL

BACKGROUND

Casting Augmented reality (AR) is a live direct or indirect view of a physical, real-world environment whose elements are augmented (or supplemented) by computer-generated sensory input such as sound, video, graphics or other data. AR is related to a more general concept called mediated reality, in which a view of reality is modified by a computer. As a result, the technology functions by enhancing one's current perception of reality.

Augmentation is conventionally done in real-time and in semantic context with environmental elements, such as sports scores on TV during a match. Some AR devices and programs are used for overlaying technical data overtop of viewed mechanical assemblies such as automobile engines or overlaying images of X-Rays on patients bodies for helping surgeons in operating rooms. With the help of advanced AR technology (e.g. adding computer vision and object recognition), the information about the surrounding real world of the user becomes interactive and can be manipulated digitally. Artificial information about the environment and its objects can be overlaid on the real world by the AR device.

SUMMARY

The inventor recognized the need for techniques whereby a viewer could look at an controllable electronic device and see a set of controls for that device would appear on or adjacent to the image of the device.

Embodiments describe AR devices to overlay controls for the device being viewed. Benefits of the embodiments include allowing control objects can be sized for people with visual handicaps and control panels for devices not physically present could be controlled by the user The present invention discloses methods, systems, and apparatus' which through the use of an Augmented Reality (AR) device, can place manual controls and virtual displays onto a surface of a controllable electronic device (CED) or next to the CED as viewed through the AR device allowing the user to manipulate the controls and view feedback via the virtual displays associated with the controllable device.

An embodiment defines a CED, an AR device, and software applications (SAs) residing on the AR device and on the CED. The AR device overlays a surface of the CED with virtual control objects and virtual feedback displays on a surface of the CED or adjacent to the CED. The use views the control objects and virtual displays on the surface and/or area adjacent to the CED and manipulate the control object via hand, head, and eye gestures recognized by the AR device and views real time feedback displayed on the virtual displays.

BRIEF DESCRIPTION OF THE DRAWINGS in the drawings.

DETAILED DESCRIPTION

Figure 1:
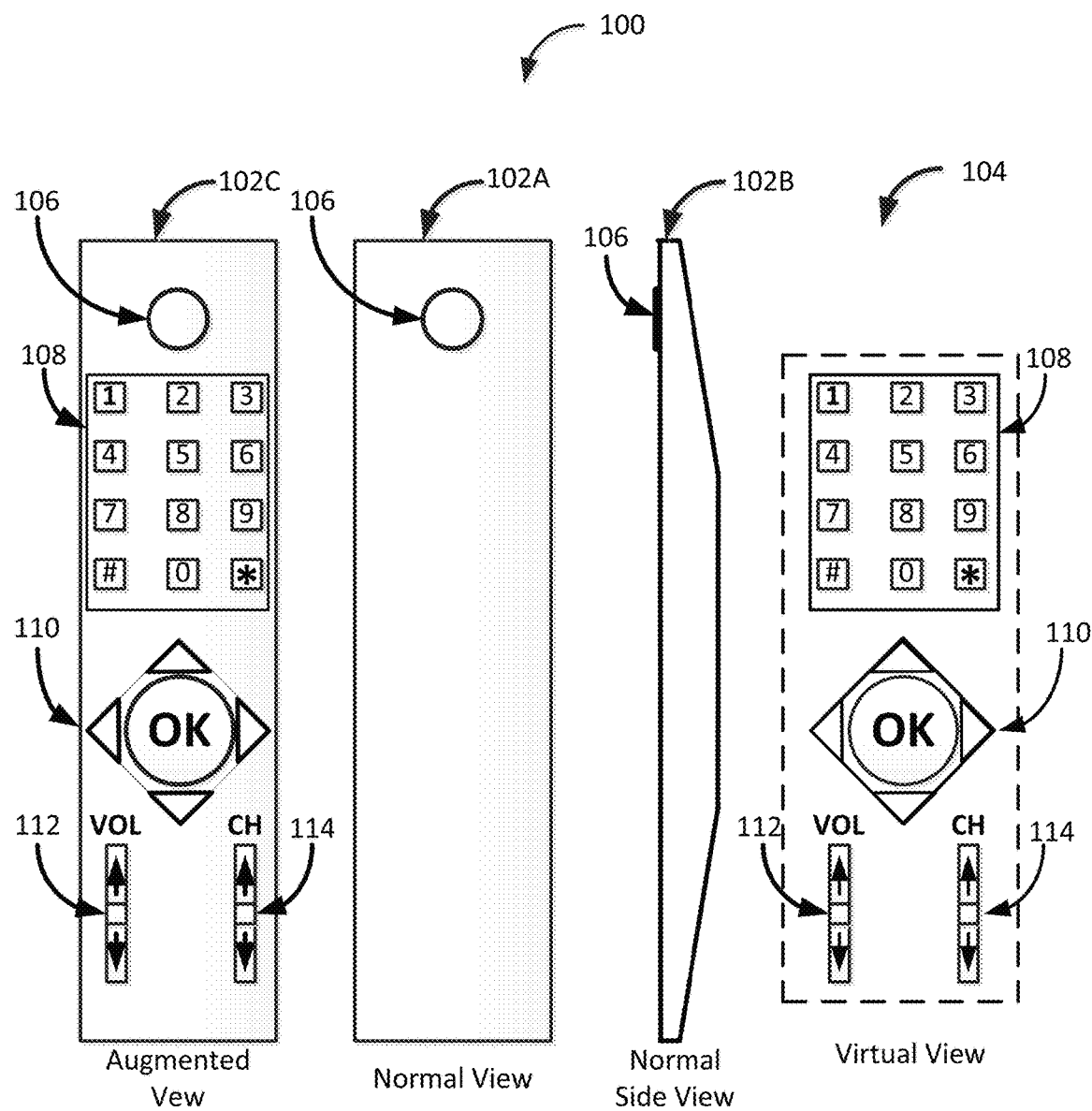
FIG. 1 is a three view drawing of a hand held remote control and view of a virtual control panel.

Embodiments describe systems presenting information to a viewer using an augmented reality device such as glasses, tables, PDAs, smart phone, etc. to view controls on top of images of smooth surfaces of a target device or any blank surface. For target devices that have physical controls, the AR device operates, after being paired with the target device the first time, to identify the target device from its appearance or if it is within close range of the AR device and overlay a set of virtual controls onto to the image of the physical target device or onto an image of any blank surface such as walls, table tops, paper, etc. Once the virtual controls are displayed, the user may, through voice, hand, eye, or head motion (VHEHM) gesturing, alter the virtual controls thus affecting operation of the target device.

Embodiments may also work with target devices that have no physical controls present on the surface of the device. In this case, the AR device identifies the target device and overlays a set of virtual controls on the image of the surface of or an image adjacent to the physical target device. Once the virtual controls are displayed, the user may, through VHEHM gesturing, alter the virtual controls causing the AR device to wirelessly send signals to the target device thus affecting operation of the target device.

Embodiments also have the ability to magnify the virtual controls for users who have problems resolving small images.

Embodiments also have the ability to display markings or text for the virtual controls in any of an enumerated set of languages allowing the target device and AR device to be shipped to other geographical market areas without necessitating changes in printed text on the surface of the target device.

In a preferred embodiment of the present invention, the user views devices such as televisions, radios, sound systems and other electronic devices which can host applications able to communicate with AR viewing devices. The AR viewing devices have mounted or embedded cameras or be connected to cameras. In this embodiment, front facing cameras are devices are on devices such as VR/AR hoods, goggles, glasses, tablets, PDAs or smart cell phones. The AR device uses a picture of the target device to identify a target device used to identify controllable devices and to capture views of the environment where devices are physically located.

In an embodiment, the user wears or holds the AR device much like a pair of glasses or holds the AR device much like a tablet, PDA or smart cellular phone or other device. The AR device is then oriented to "look" at another device, herein the "target" device.

Once the AR device focuses on the target device and identifies it, the AR device initiates communications with the target device. Once the device and device type have been identified by the AR device, a group of control objects and their operation modes are transferred to the AR device as control object metadata.

These control objects and their associated metadata may be transferred wirelessly from the target object, or from a data repository to the AR device. Alternatively, the control objects and their associated metadata may be stored on a computing device wirelessly connected to the AR device, or the control objects and their associated metadata may be contained in a database embedded within the AR device. The control objects may be objects such as buttons, dials, sliders, meters, etc. available for the target device as well as placement of the control objects on the target device and how the control objects are manipulated by the user.

After receiving the control metadata for the target device, the AR device overlays visual objects representing the control objects on top of and/or adjacent and/or around the target device, or on any blank or open surface, as viewed through the AR device.

At this point in the embodiment, the user may manipulate the control objects through any number of means such as:

Voice commands by the user.

Pointing at the control object with a finger or other pointing device and performing a manual gesture such as pushing the finger toward the control fixture, which in this example, may be a button, dial, or slider object.

Many manual gestures may be recognized by the AR device such as: pushing, twisting (with the hand), horizontal or vertical swiping, grabbing, releasing, or other recognizable manual gestures.

The gesture may also be an eye gesture detected by a camera embedded within the AR device and focused on the user's eyes. Eye gestures may be horizontal or vertical movement of the eye and/or blinking of the eye lids, or other movements of the user's eyes.

The AR device may also include a gyroscopic device and/or an accelerometer device allowing the AR device to be moved with head or hand movement thereby inputting a gesture based on the specific head or hand movement of the AR device itself.

In another preferred embodiment, the target device may also have a touch sensitive surface on which the AR device visually overlays the control objects. In this embodiment, the target device communicates a touch event by the user on the physical surface of the target device. For example, the control fixture may be a vertical slider bar with a meter positioned above the bar. If the bar is at the bottom of the slider control fixture, the needle on the meter may be positioned at the extreme left of its horizontal movement. If the user touches the bar at the bottom of the slider control fixture and moves it to the top of the control fixture, the target device may send continuous metadata to the AR device which will display or show, in real time, the slider bar moving from the bottom to the top of its movement range and the associated needle in the meter display as it is effected by the movement of the slider bar. The metadata sent by the AR device can be any kind of control—it can be wireless Ethernet signals indicating the control, infra red or Bluetooth controls, or any kind of control sent to the target device.

To a viewer of the target device not wearing an AR device, the user would appear to be sliding his finger on a blank surface. In this embodiment, any text appearing on the blank surface of the target device may be in any of an enumerated list of languages.

In another preferred embodiment, the user of the AR device may cause a menu display to be presented on the AR display. In this embodiment, the menu may have a list of controllable devices to be presented to the user. In this example, one of the controllable devices may be the kitchen area of a home which is not within eye site of the user. In this example, the user, sitting in the living room or in some remote environment accessible over a network, chooses the oven display. The AR device displays an image of the oven control panel with the control objects. The user may manipulate the controls by reaching for the control as displayed in the AR space. That is, the images will appear to be in front of the user and the AR device senses the user's hand/finger on the virtual control objects for the oven. This embodiment allows a controllable device to be controlled even if the device is not in eye sight of the AR device or resides across a network.

In a related embodiment, the AR device may be in communications with the controllable target over a network. The user could be at work and the controllable target may be a set top box with an embedded video recorder located at the user's home. In this example, the user would select the set top box video recorder from a list of controllable targets using the AR device. At this point, the AR device would communicate with the set top box video recorder over the network. As the user manipulates the controls on the set top box video recorder, the virtual displays of the device as presented by the AR device are displayed to the user. The user selects program(s) to be recorded along with the time to start and stop the recorder.

In another embodiment, the user may not be able to resolve images with small incremental markings. In this embodiment, a display or control is provided that enables the user to set some control variable in the AR device itself causing it to overlay control or other displays that appear to be magnified.

Now referencing FIG. 1 where 100 depicts 102A a plain hand held remote control device for a typical television. In this depiction, 102A has a physical power button 106 with the balance of the front of the remote being a smooth surface with no other physical buttons or controls. View 102B depicts the side view of the same remote as depicted as 102A. Note that there are no physical buttons or controls shown on the side of the remote control device.

Figure 4B:
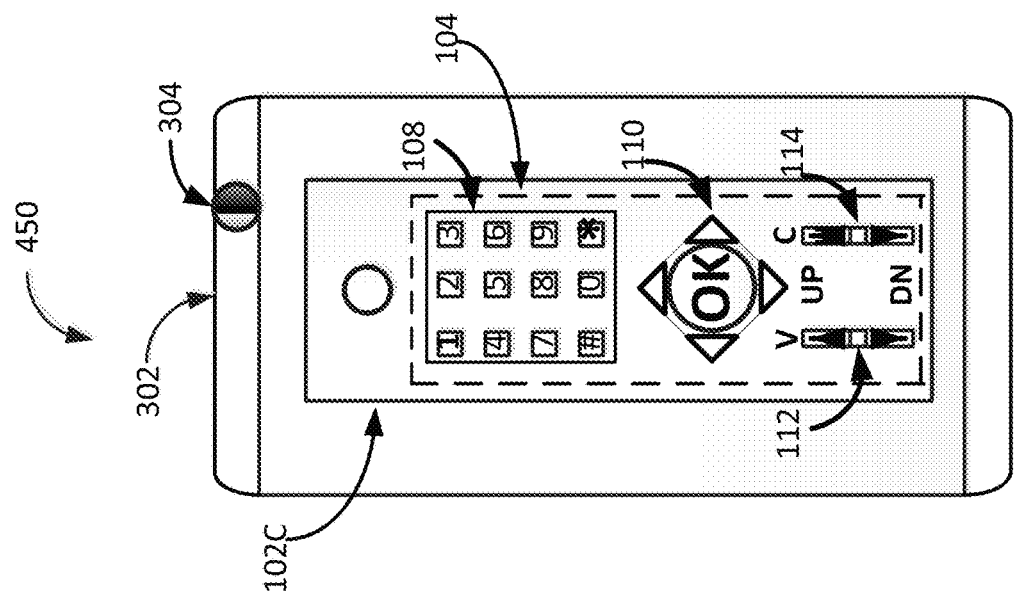
FIG. 4B is a depiction of a cell phone or PDA showing a hand held remote control device augmented with a virtual set of control objects overlaid on the blank surface of the hand held remote control device.

104 depicts a virtual control set including a keypad 108, a navigation cluster 110, and a volume rocker control 112 and a channel rocker control 114. This virtual control set is shown overlaid onto the blank surface depicted as 102A resulting in the augmented view depicted as 102C. This view is also depicted in FIG. 4B on a cell phone or PDA AR device and is shown in FIG. 5B on a tablet computing device. All of these depictions show an image of the remote control on the surface of the device.

With any of these depictions, if the user physically touches a control, the volume up rocker 512 in FIG. 5B for example, the AR device communicates the rocker up press to another device—either to the actual physical remote control or to the target. If communicated to the remote control, that device which will then execute the virtual touch by sending an IR code to the device it is controlling, in this case, television 606 depicted in FIG. 6.

Figure 2:
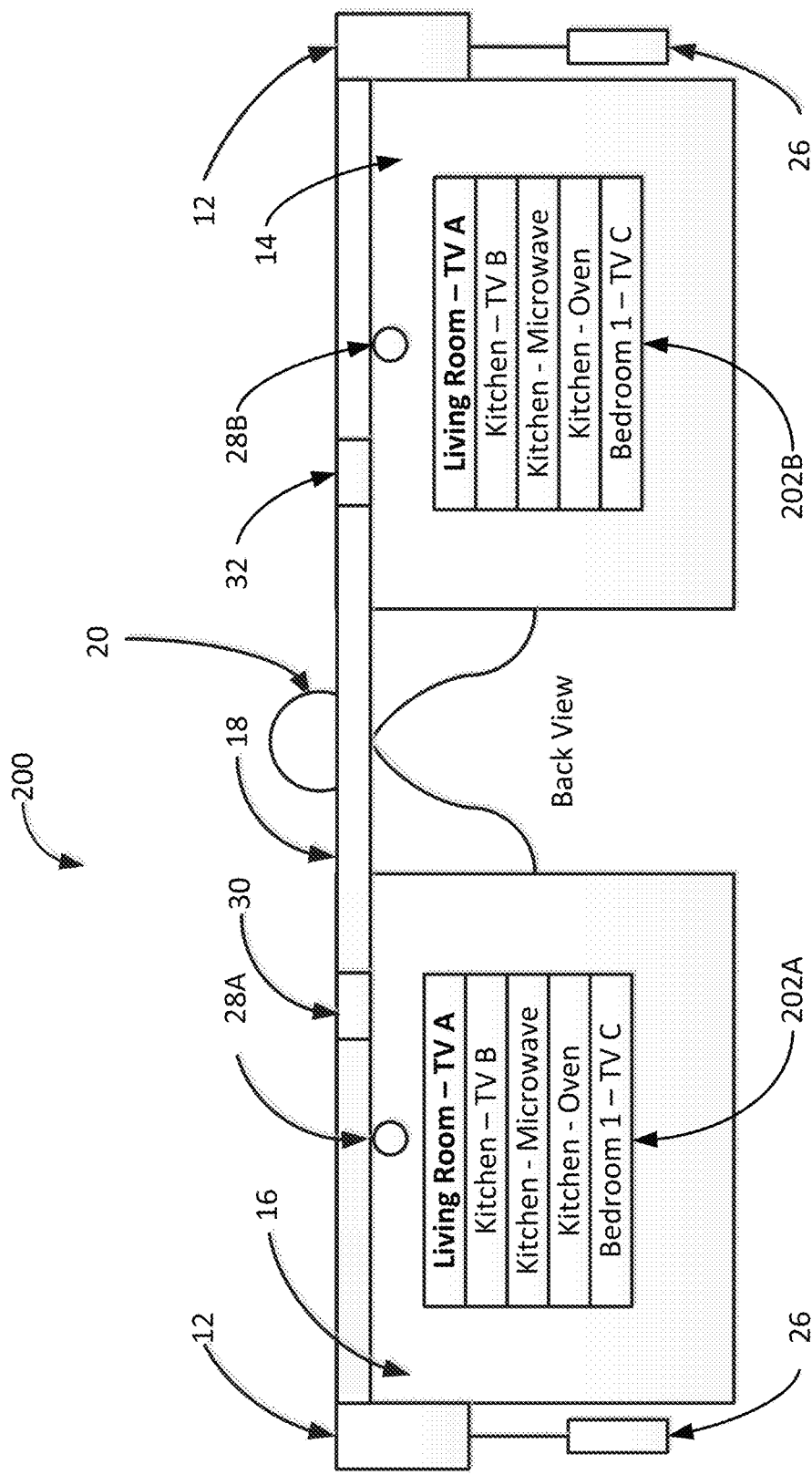
FIG. 2 is a depiction of the back side of a augmented reality glasses device with a menu showing target devices available for selection.

Now referencing FIG. 2 where 200 depicts a VR device that is physically a pair of enhanced glasses. This depiction is the back view of the glasses with a left lens 16 and a right lens 14. The lenses are, in this depiction, LCD display screens. Also in this depiction is an audio system with ear buds 26 (for the left and right ears) embedded in temple pieces 12, back facing cameras 28A and 28B used to monitor the eyes for gesture controls. In this depiction, forward facing camera 20 and accelerometer 30 and gyroscope 32 for sensing head movement for head gestures. In this depiction, lenses 14 and 16 are displaying a menu of controllable target devices derived from a database depicted in FIG. 8.

Figure 3:
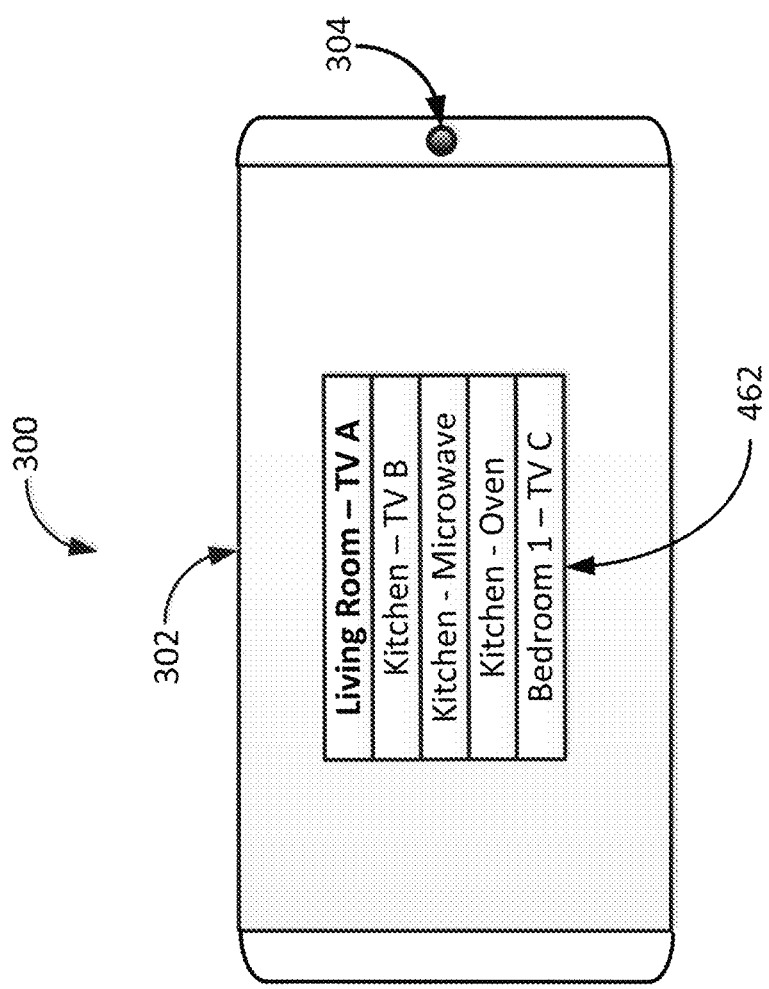
FIG. 3 is a depiction of a cell phone or PDA with a menu showing target devices available for selection.

Now referencing FIG. 3 where 300 depicts an AR device 302, which in this depiction, is a cell phone or PDA. AR device 302 has a back facing camera 304 for recognizing some gesturing by the user and has a forward facing camera, for recognizing physical controllable devices. In this depiction, AR device 302 is displaying a menu of controllable target devices derived from a database depicted in FIG. 8.

Figure 4A:
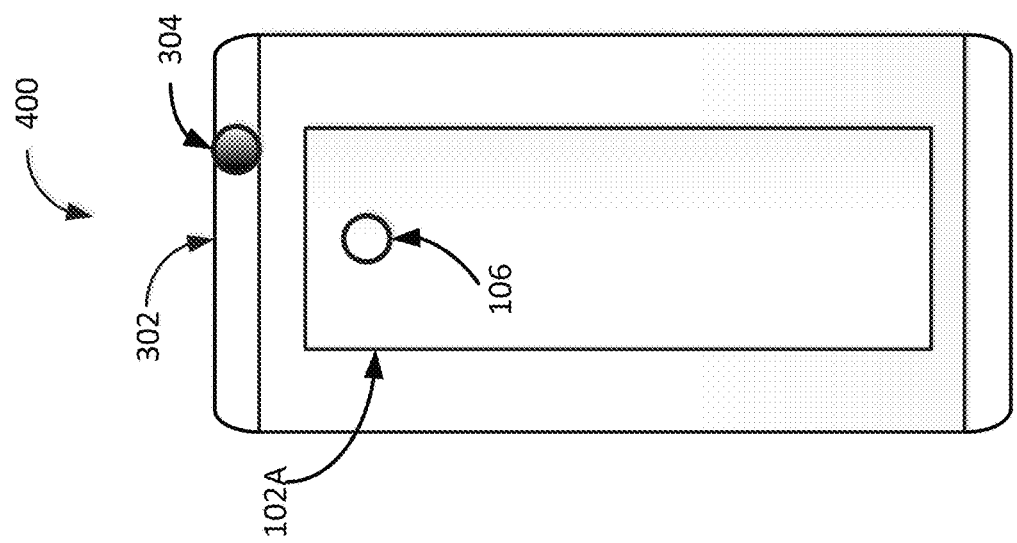
FIG. 4A is a depiction of a cell phone or PDA showing a hand held remote control device that has no physical controls on its front surface.

Now referencing FIG. 4A where 400 depicts AR device 302 non augmented view of remote control device 102A which only has a single physical control button 106. In this depiction, remote control device 102A is being displayed on AR device 302 without any augmentation showing a control set of objects. In FIG. 4B, 450 depicts an augmented view of remote control device 102C where control set 104 containing keypad 108, navigation controls 110 and volume rocker 112 and channel rocker 114 are depicted. In this depiction, if the user touches any of the virtual controls depicted, such as channel up rocker 114, AR device 302 sends notification of the control action to remote control device 102C which in turn transmits the command code for the touch to television 606 depicted in FIG. 6.

Figure 5A:
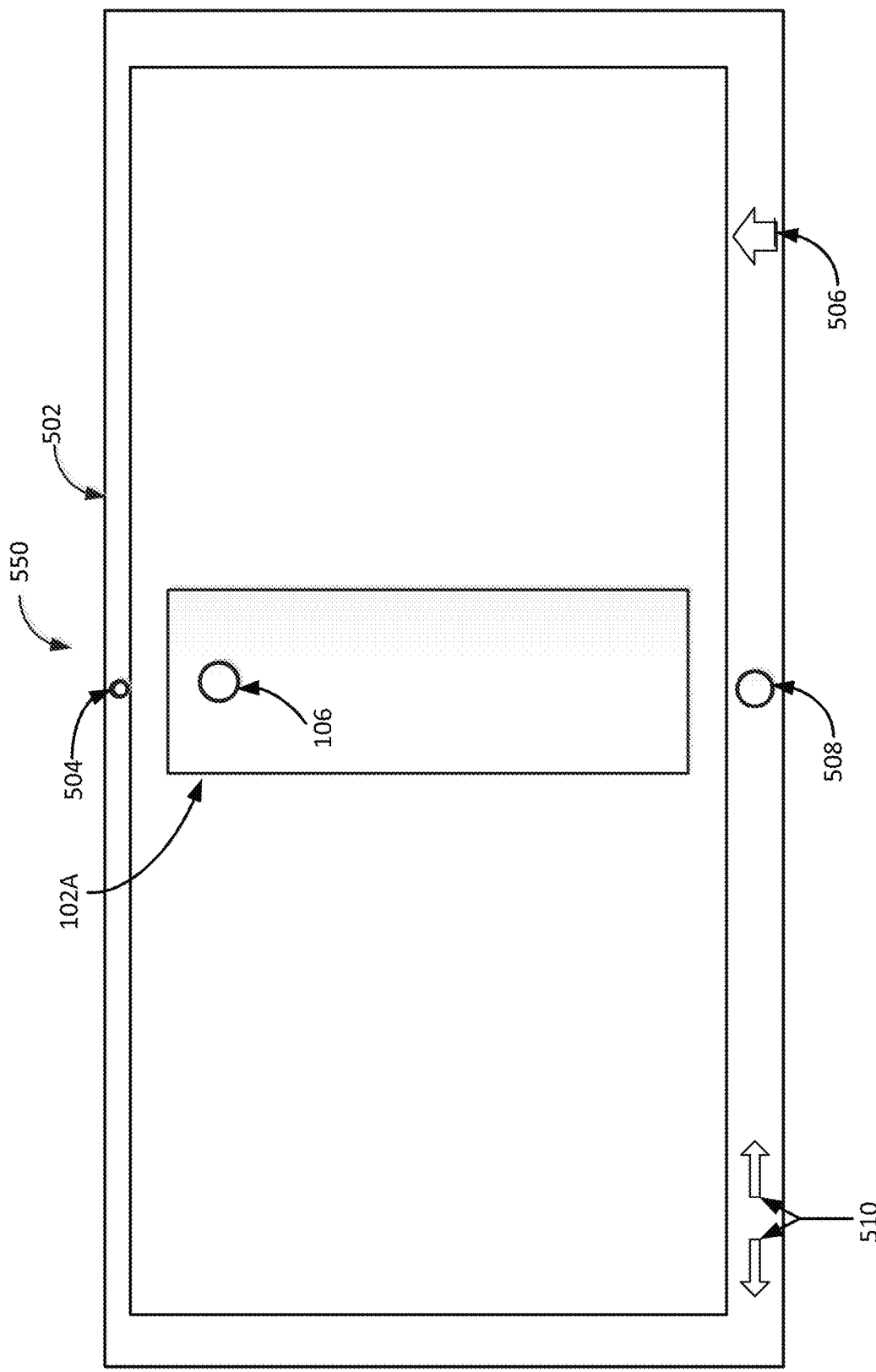
FIG. 5A is a depiction of a tablet computer showing a hand held remote control device augmented with a virtual set of control objects overlaid on the blank surface of the hand held remote control device.
Figure 5B:
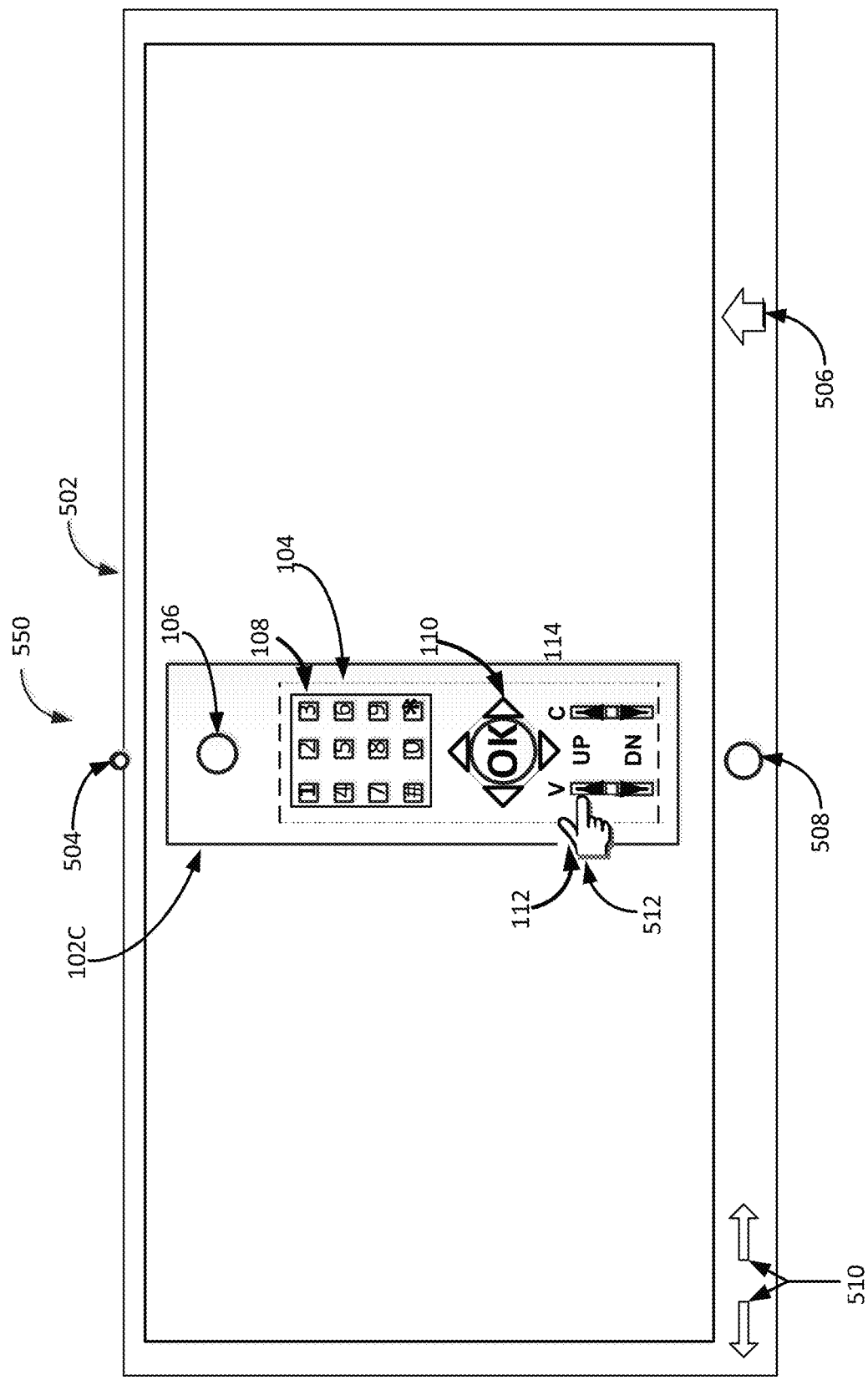
FIG. 5B is a depiction of a tablet computer showing a hand held remote control device augmented with a virtual set of control objects overlaid on the blank surface of the hand held remote control device.

Now referencing FIG. 5A where 500 depicts AR device 502, which in this case is a tablet computer. In this depiction, AR device 502 contains a power button 508, back facing camera 504, home icon 506, and navigation icons 510. AR device 502 also contains a forward facing camera, for recognizing physical controllable devices. Depiction 500 shows non augmented view of remote control device 102A which only has a single physical control button 106. In this depiction, remote control device 102A is being displayed on AR device 502 without any augmentation showing a control set of objects. In FIG. 5B, 550 depicts an augmented view of remote control device 102C where control set 104 containing keypad 108, navigation controls 110 and volume rocker 112 and channel rocker 114 are depicted. In this depiction, if the user touches any of the virtual controls depicted, such as channel up rocker 114, AR device 302 sends notification of the control action to remote control device 102C which in turn transmits the command code for the touch to television 606 depicted in FIG. 6.

Also in this depiction, the user has their hand pointing to the front side of tablet computer 502 where the front facing camera, captures the image of the user's hand and replicates it with an icon. As the user moves their hand with his finger pointing, AR device 502 displays an image of his pointing hand/finger 512. In the current depiction, the user is pointing to volume up rocker control 112 to the volume up. When the user moves their hand/finger forward as if to push volume up rocker control 112, AR device 502 transmits the command code for the touch to television 606 depicted in FIG. 6.

Figure 6:
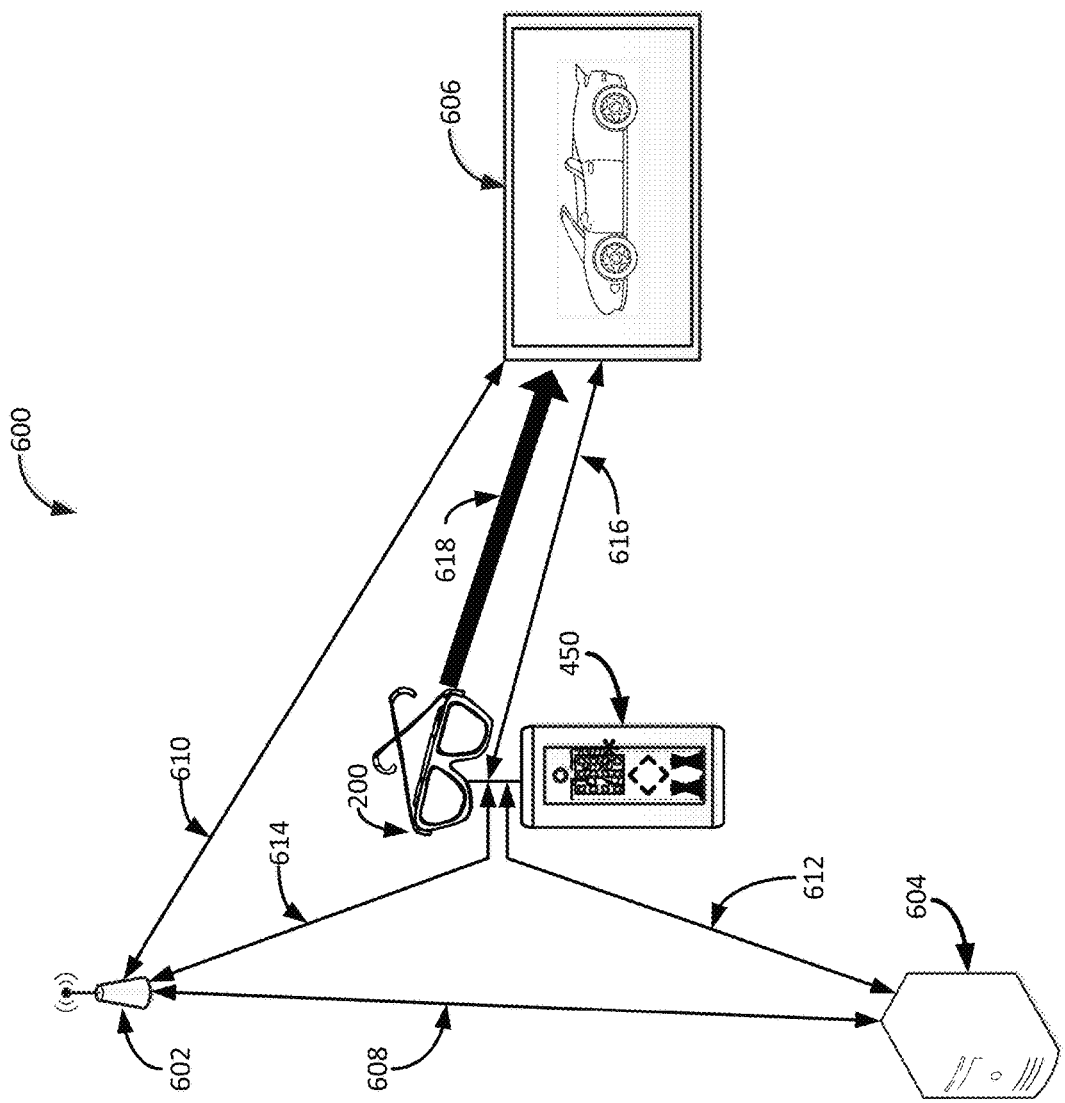
FIG. 6 is a depiction of a typical system of the invention where the AR device, remote control device, television, Wifi Access Point (AR) and a computing device containing a metadata database is illustrated.

Now referencing FIG. 6 where 600 is a depiction of a television 606 that can be controlled over and IR link and a Wifi link, a database server 604 where control objects for physical remote control devices such as 2002A, a Wifi access point (AP), and AR devices 200 and 450.

In this depiction, AR devices 200 and 450 can pick a device to control by invoking a menu of controllable devices as shown in FIGS. 2 and 3. For example, if the user in FIGS. 2 and 3 selects TV A from the menu as displayed in FIG. 2 or 3, the AR device accesses the database contained in either the AR 200/450 device or contained in server 604. The database associates the television with the proper hand held remote control device, which in this depiction is remote control device 102A in FIG. 1.

Once the remote control device has been determined, AR device 200/450 retrieves the control objects and metadata from the database on server 604 and display the control object on an image of physical remote control device 102A resulting in being depicted as remote control device 102C.

If the user is viewing a virtual image of remote control device 102A/102C through AR device 200/450, the user becomes able to manipulate the virtual control objects 104 overlaid on remote control device 102A/102C. The user may activate one of virtual control objects 104 by pointing at the image of the control object with a finger or other pointing device within view of the AR device 200 camera (allowing AR device 200 to see his hand) and performing a manual gesture such as pushing the finger toward the control fixture, which in this example, may be a button, dial, or slider object. Manual gestures may be recognized by the AR device such as: pushing, twisting (with the hand), horizontal or vertical swiping, grabbing, releasing, or other recognizable manual gestures. Gestures may also be an eye gesture detected by cameras 28A/28B embedded within AR device 200 and focused on the user's eyes. Eye gestures may be horizontal or vertical movement of the eye and/or blinking of the eye lids, or other movements of the user's eyes. AR device 200 also includes gyroscopic and accelerometer devices 30 and 32 allowing AR device 200 to be moved with head movement or hand movement thereby using gestures based on the specific head or hand movement. If the user is using AR device 450, he may use the same gesturing as used with AR device 450 and in additional, AR device 450 having a touch sensitive display screen, the user may use a finger or stylus to touch a control object and manipulate it. AR device 450 also contains gyroscopic and accelerometer devices, not shown, to detect movement of the device which can be interpreted into control gestures.

Once the user manipulates a control object, the volume rocker control 112, for example, and the user is line of sight of television 606, and he is using AR device 200, which in this depiction has an IR emitter, the user can look at television 606, and AR device 200 will emit the appropriate IR command over IR link 618 to television 606. If the user is not within line of sight of television 606, AR device 200 communicates the command over Wifi to television 200 via Wifi link 614/610. In the case where AR device 200 and television 606 can communicate over direct Wifi link, commands will be sent from AR device 200 to television 606 via link 616.

Figure 7:
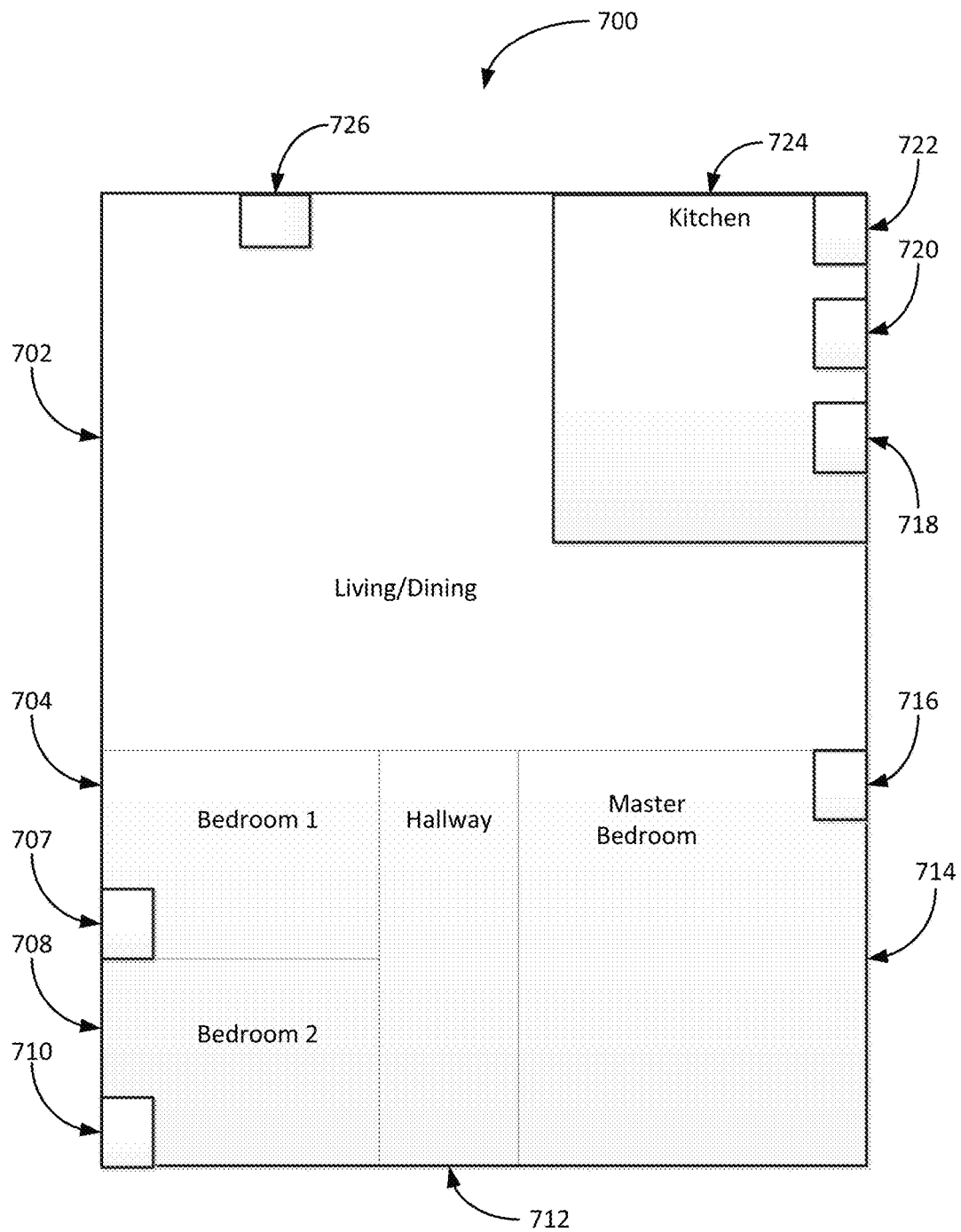
FIG. 7 is a depiction of a house where the rooms and controllable devices are located which will be displayed to the user on the AR device lenses.

Now referencing FIG. 7 where 700 depicts the layout of a home with three bedrooms. On this depiction bedroom 1, 704 contains television 707. Bedroom 2, 708 contains television 710, and master bedroom 714 contains television 716. Kitchen 724 contains three controllable target devices, those being television 718, oven 720 and microwave 722. In this depiction, the user may launch an application on AR device 200/450 where the application displays the layout of the house along with icons representing the controllable target devices. The user can navigate from one icon to another through the use of gesture commands as previously described. Once the user has navigated to the target device's icon, the user executes a selection gesture and the control objects for the just selected target device replace the image of the layout of the house. Once the control objects for the selected target device are displayed on the lenses of AR device 200/450, the user may begin controlling the target device. The user may also, through an application, display on AR device 200/450 a menu of controllable devices contained in house 702 and through gestures select one of the devices to control.

Figure 8:
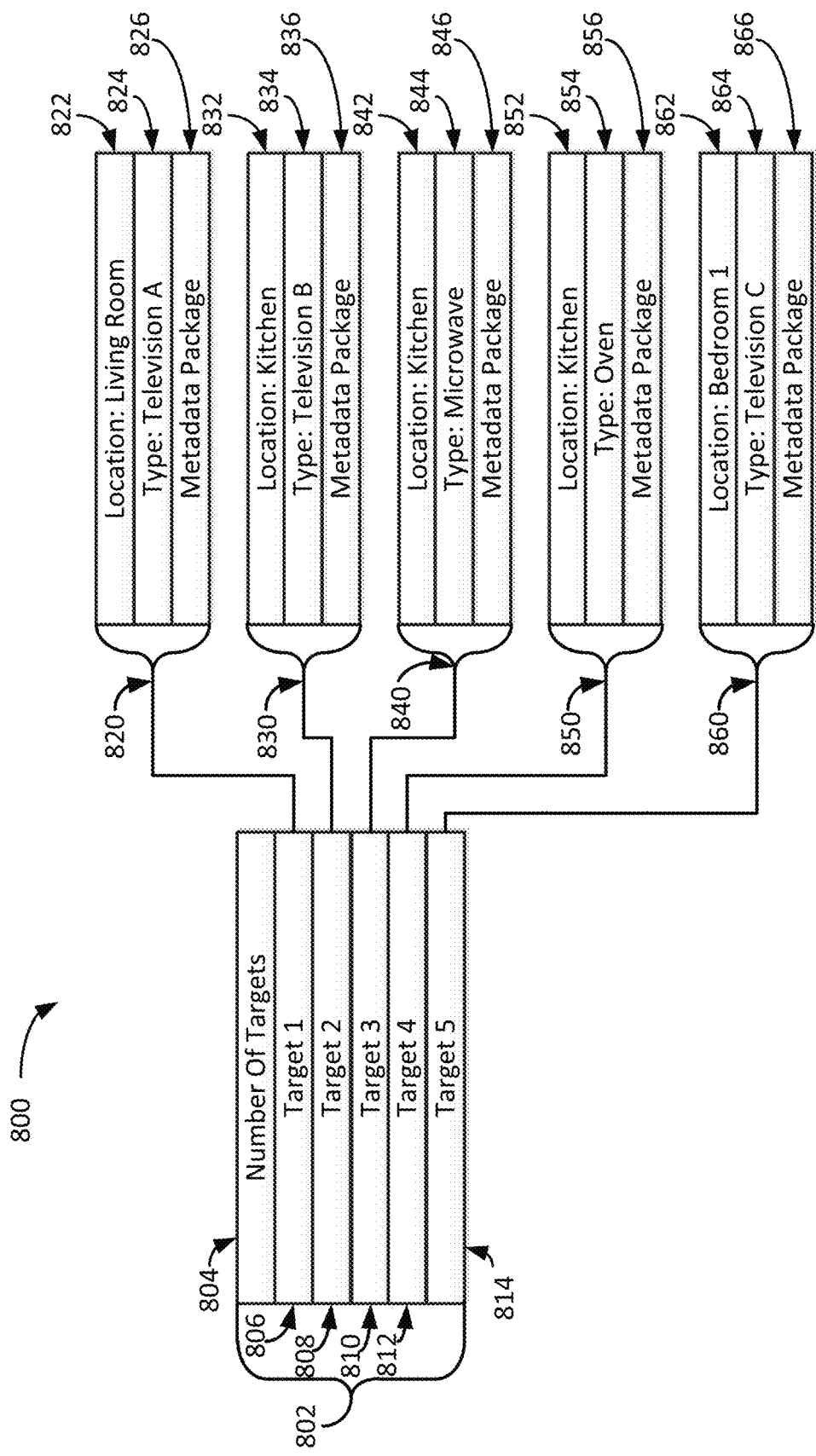
FIG. 8 is a depiction of a database containing five target devices where each target contains a location, type of target, and the metadata package used by the AR device to create a virtual overlay specific to the target.

Now reference FIG. 8 where 800 depicts a metadata database 802 where five target device entries 806, 808, 810, 812 and 814 each containing an entry with at least three pieces of data, these being, the location of the target device (822, 832, 842, 852, and 862). Additionally, the type of the target device (824, 834, 844, 854, and 864) and the metadata package for the control objects (826, 836, 846, 856, and 866).

If the user wants to control a device that is not in visual range of AR device 200, the user may cause an application to be launched which will create an ordered list of target devices and display the list on the lenses of AR device 200. The ordered list of target devices displays the location of each of the target devices and the type of devices. Note FIG. 2 where 200 depicts the back view of AR device 200 with an ordered list created from database 802 shown in FIG. 8. The ordered lists 202A and 202B displayed on the left and right lenses have the first entry highlighted or BOLDED. The user navigates through the list using previously described gesture commands. As the list is navigated, the high light currently on the first list entry will change as the user moves the focus from one entry to another. Once the user has navigated to an entry for the device the user wants to control, the user uses another gesture command that selects the target device.

For this discussion, assume that the user has selected the fourth entry, "Kitchen—Oven" as the target device to be controlled. Once the selection gesture has been recognized by AR device 200, the ordered list will be removed from the lenses of AR device 200 and a view of the oven controls will be displayed as shown in FIG. 9.

In one embodiment, the lists are selected or ordered based on the direction that the glasses are "looking". For example, if the user is close to and looking at the living room TV, that is placed first on the list.

Figure 9:
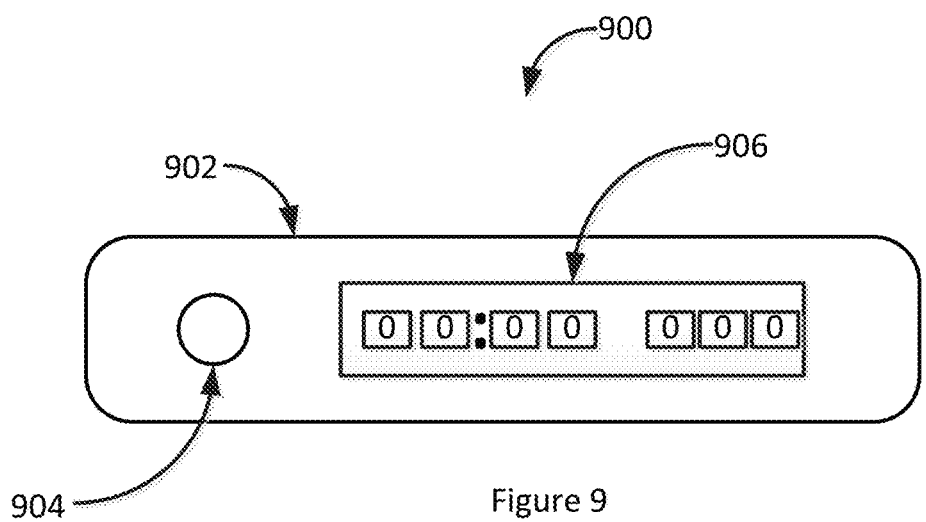
FIG. 9 is a depiction of a control unit mounted on a kitchen oven that will be presented to the user on the AR device lenses.

In FIG. 9, 900 depicts the oven control panel 902. In this depiction there is a movable dial 904 and a data display 906 which shows a start time in hours and minutes and a three digit display showing minutes to cook. This display allows the user to, using gesture commands, navigate to the control that the user wants to manipulate such as the start timer hours and minutes or the number of minutes to cook and change those values using controls or gestures as described.

Figure 10:
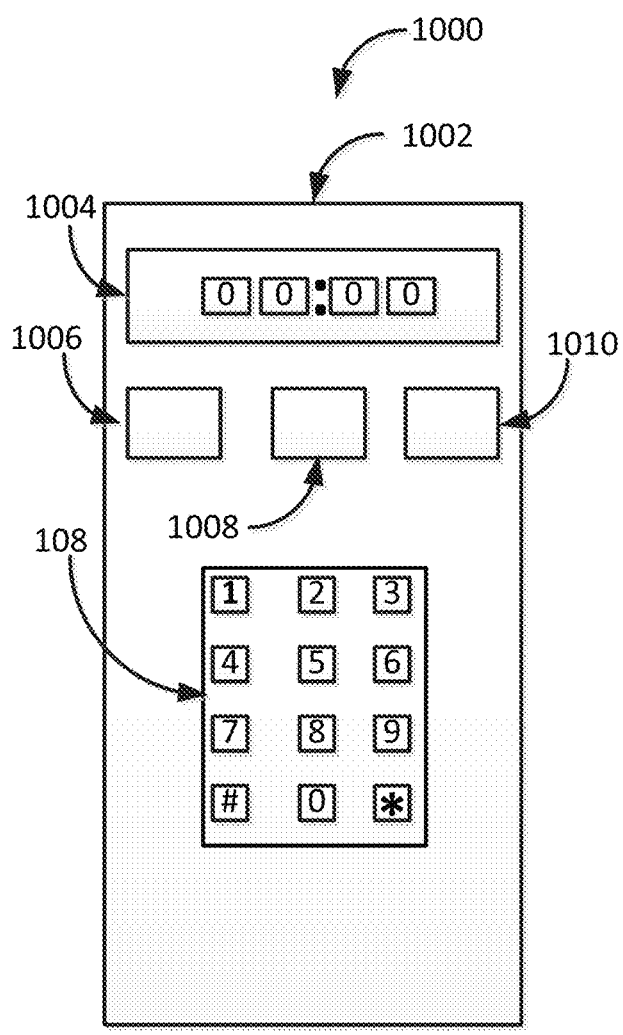
FIG. 10 is a depiction of a control unit for a microwave oven that will be presented to the user on the AR device lenses.

Likewise FIG. 10, 1000 depicts a microwave control panel 1002. In this depiction, a number pad 108 allows the user to enter start times on start timer display 1004. Push buttons Start 1006, Continue 1008, and Stop 1010 allow the user to initiate those functions on the target microwave oven.

Figure 11:
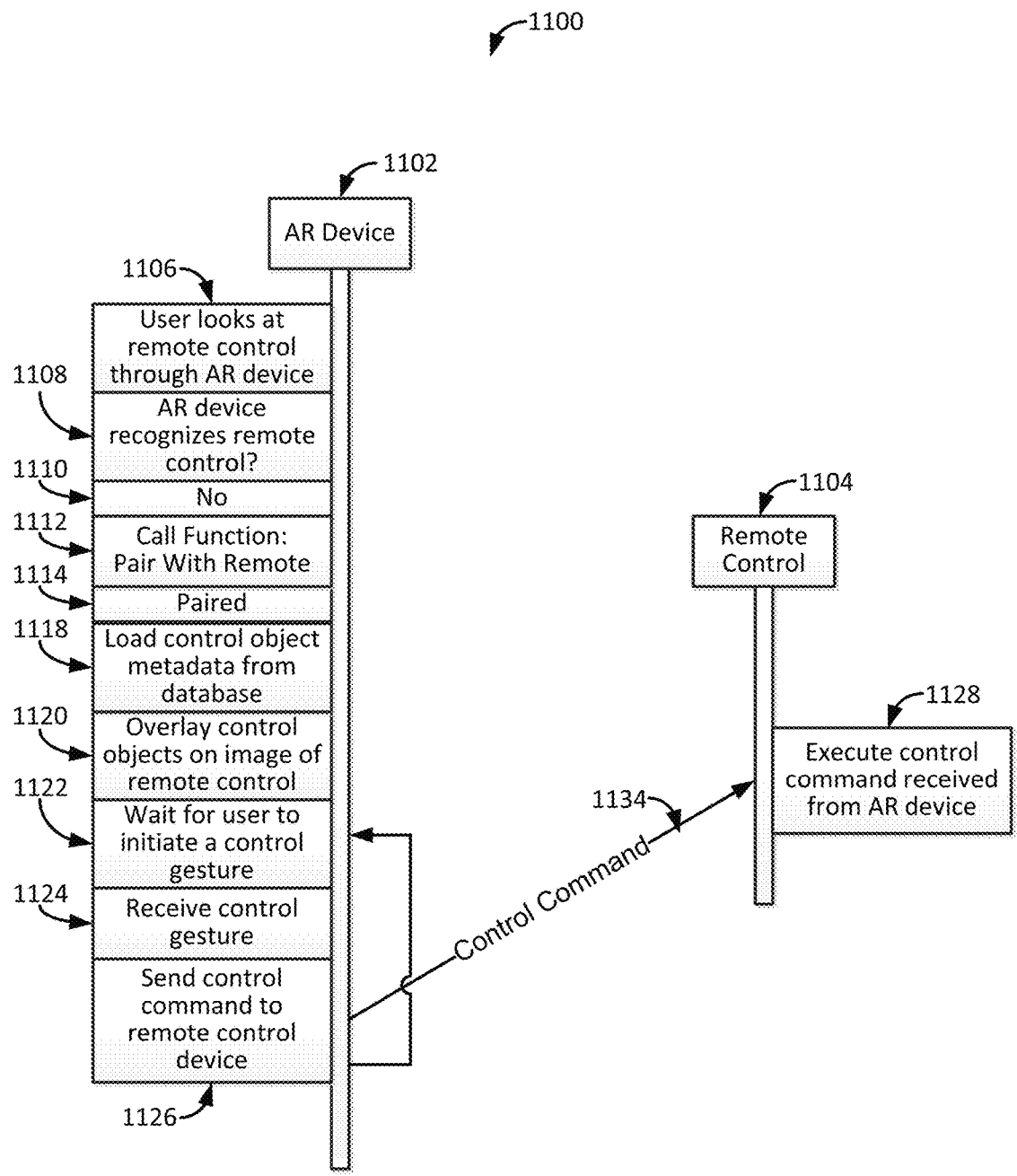
FIG. 11 is a depiction of a logic flow chart showing how an AR device is paired to and sends control commands to a remote control device.

Now referencing FIG. 11 where 1100 depicts a logic diagram for an Augmented Reality (AR) device establishing a communications link with a remote controller device. In this depiction the communications link is via Bluetooth protocol. The communications link may be any recognized protocol such as, but not limited to, Bluetooth, Direct Wifi, or any other established protocol or a proprietary protocol.

This depiction starts with processing block 1106 "user looks at remote control through AR device". This processing block assumes that the user points the AR device being used at a remote control device after which control falls through to decision processing block 1108 "AR device recognizes remote control?". This processing block attempts to recognize the remote control device. The mechanism for recognition may be capturing of the image for the remote control device and comparing the image against a database of remote control device images. If the AR devices does not recognize the remote control device control will transfer to results processing block 1110 "NO". This processing block transfers control to call function processing block 1112 "Call Function: Pair With Remote". This processing block will call the function "Pair With Remote". This function attempts to pair AR device 1102 with the remote control being "looked" at with AR device 1102. For the purposes of this depiction, it is assumed that the pairing between AR device 1102 and remote control device 1104 was successful. After function: pair with remote returns with a status of paired, control transfers to results processing block 1114 "Paired". This processing block transfers control to establish comm link processing block 1118 "load control object metadata from database". This processing block loads into AR device 1102 the set of objects and data that will be used to overlay an image of the buttons, controls, and text legends onto the surface of remote control device 1104 after which control will fall through to overlay control objects processing block 1120 "overlay control objects on image of remote control". This processing block will overlay the displayed image of remote control device 1104 onto the image being displayed with an image of the buttons, controls, and text legends the operator will interact with. After the overlay operation, control will fall through to the wait processing block 1122 "wait for user to initiate a control gesture". This processing block is the first processing block in a loop. This processing block will wait for the user to input a gesture command, previously discussed, that will interact with one of the displayed control objects after which control will fall through to receive processing block 1124 "receive control gesture". This process block receives the control gesture made by the user and interprets the gesture after which control will fall through to send processing block 1126 "send control command to remote control device". This processing block will send control command 1134 to remote control 1103 at execute processing block 1128 "execute control command received from AR device". This processing block will, in response to the received control command, send the corresponding command from remote control 1104 to the device being controlled, which in this case is television 606. After processing block 1126 has sent control command 1134 to remote control 1104, control will be transferred from processing block 1126 to wait processing block 1122 "wait for user to initiate a control gesture".

Figure 12:
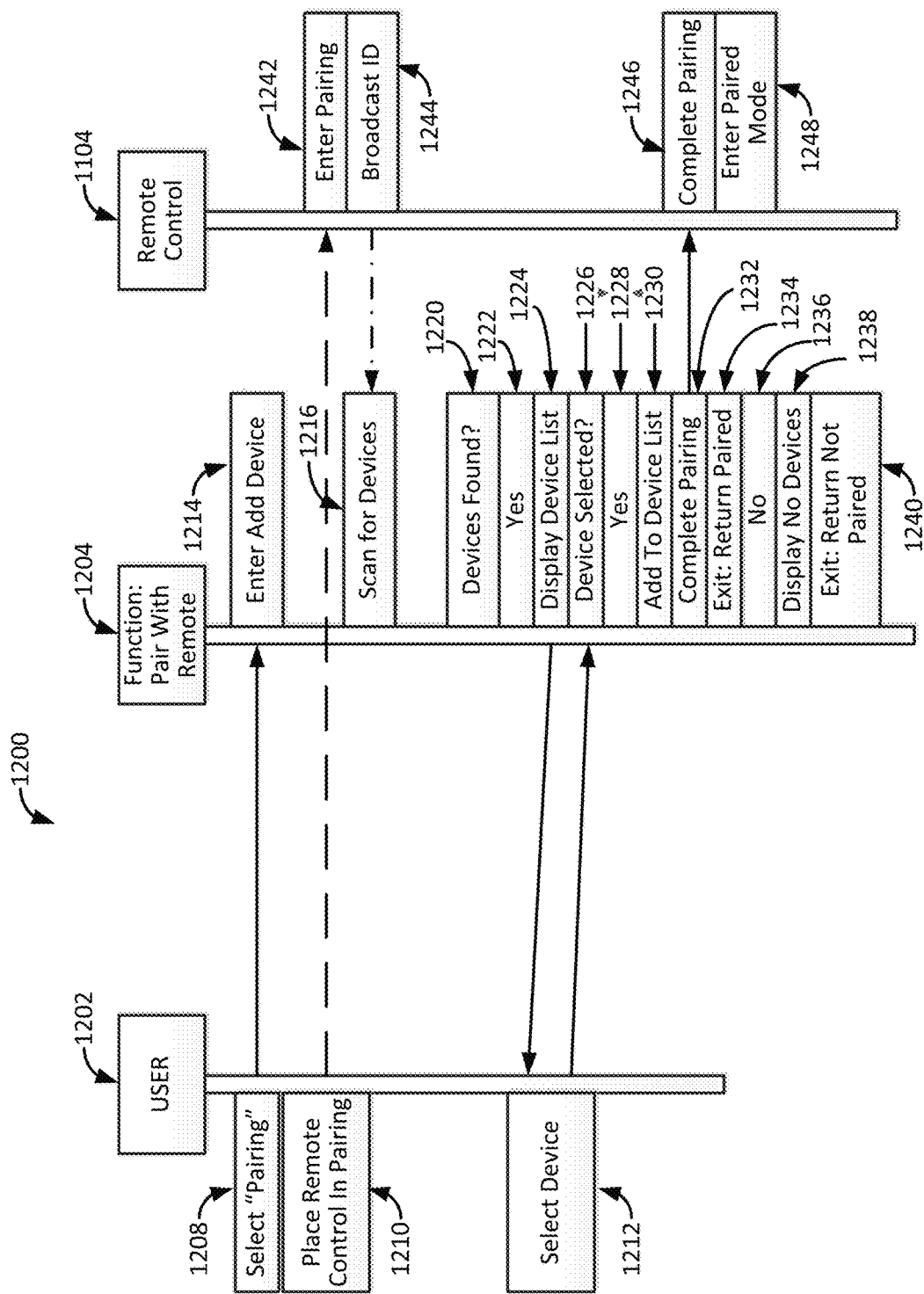
FIG. 12 is a depiction of a logic flow chart showing how an AR device is discovers a controllable remote control device and pairs with it.

Now referencing FIG. 12 where 1200 depicts a logic diagram for the callable function "Pair With Remote". Execution of this function begins with call processing block 1112 calling "function: pair with remote" 1104. Execution begins with USER 1202 at select processing block 1208 "select Pairing". This processing block is the USER 1202 initiating a function on the AR device 1102 which is processing block 1214 "enter a new device" which starts the pairing processing on AR device 1102. USER 1202 will then, at processing block 1210 "place remote control in pairing" will initiate the pairing process on remote control 1104 at processing block 1242 "enter pairing". Processing block 1242 will perform the initialization for the pairing process after which control falls through to processing block "broadcast ID" 1244. Processing block 1244 begins sending out its identifying information such as an ID. Meanwhile, processing block 1216 on AR device 1102 is scanning in discovery mode for devices broadcasting their identifying information. As devices are discovered through the discovery processes, they will be saved. At some point in the process control will fall through to processing block 1220 "devices found?" If the scan discovery process found one or more devices, control is transferred to results processing block 1222 "Yes" after which control falls through to display processing block 1224 "display device list" to display a list of devices that were found. The list is displayed on AR device 1102 and a notification displayed to USER 1202 to make a device selection. Once the user makes a device select, a notification is sent back to process block 1226 "device selected?".

If the user selected a device from the displayed list, control falls through to results processing block 1228 "Yes" after which control will fall through to add processing block "add to device list". This processing block will result in the selected device being added to a device list for recognized devices after which control will fall through to processing block 1232 "complete pairing". This processing block will communicate directly with remote control 1104 and complete the pairing process after which control will fall through to exit processing block 1234 "exit: return paired". If decision block 1220 "devices found" determined that no devices were discovered during the scan for devices, control would have been transferred to results processing block 1236 "NO" after which control would have fallen through to display processing block 1238 "display no devices". This processing block would have displayed a dialog message to USER 1202 on AR device 1102 informing USER 1202 that no parable devices were discovered after which control would have fallen through to exit processing block 1240 "exit: return no paired".

Other embodiments are possible. The present application is described use with only a few different kinds of AR devices, but it should be understood that this device could be used with any control device and any controlling device. One advantage of this system, is that by using this system, the user can control many devices, even ones that was not intended to be used with an AR device, through the AR device's simulation of the remote control functions of the device.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be controlled by a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A remote controlling system, comprising:
a first device, having a camera, said camera obtaining imaging information about a target device to be controlled,
said first device having a processor, running a program which automatically recognizes at least one aspect of said target device to be controlled based on said imaging information, wherein said program recognizes an image of a remote control for said target device in said imaging information by capturing of the image for a remote control device for the target device, and comparing the image of the remote control device against a database of remote control device images,
and said first device having a viewable display that shows a view indicative of controls for said target device to be controlled, and if the image of the remote control device matches the database, then overlaying control objects for the target device on an image of a remote control, that is displayed on the viewable display, where said control objects are selectable for controlling said target device,
to produce outputs that control said target device wherein the first device accesses a database to determine a list of different target devices to be controlled within an area and produces a viewable display showing said list of target devices, and accepting a selection of a target device among said list of target devices to be controlled, and responsive to accepting said selection of said target device, producing outputs indicative of controlling said target device, wherein the first device includes augmented reality glasses, and the list of target devices is ordered based on a direction of viewing of the augmented reality glasses, where a first direction of viewing of the augmented reality glasses orders the list of target devices in a first way that puts items in the direction of viewing higher, being and a second direction of viewing puts different items in the second direction of viewing higher.

2. A method of remote control of a target device, comprising:
in a first device, obtaining imaging information about a target device to be controlled;
automatically recognizing at least one aspect of said target device to be controlled based on said imaging information;

based on said at least one aspect, creating a display of multiple controls for the target device where said controls include at least buttons, rocker devices for controlling said target device, and navigation controls with arrows for controlling said target device;

accepting commands associated with selection of controls among said multiple controls;

producing outputs that control said target device, based on said selection; and the first device accessing a database to determine a list of different target devices to be controlled within an area and producing a viewable display showing said list of target devices, and accepting a selection of a target device among said list of target devices to be controlled, and responsive to accepting said selection of said target device, producing outputs indicative of controlling said target device that was selected wherein the first device includes augmented reality glasses, and the list of target devices is ordered based on a direction of viewing of the augmented reality glasses where a first direction of viewing of the augmented reality glasses orders the list of target devices in a first way that puts items in the direction of viewing higher, being and a second direction of viewing orders the list to put different items in the second direction of viewing higher.

* * * * *